(12) United States Patent
Koishi

(10) Patent No.: US 7,844,852 B2
(45) Date of Patent: Nov. 30, 2010

(54) DATA MIRROR CLUSTER SYSTEM, METHOD AND COMPUTER PROGRAM FOR SYNCHRONIZING DATA IN DATA MIRROR CLUSTER SYSTEM

(75) Inventor: Takahiro Koishi, Tokyo (JP)

(73) Assignee: NEC Corporation, Tokyo (JP)

( * ) Notice: Subject to any disclaimer, the term of this patent is extended or adjusted under 35 U.S.C. 154(b) by 815 days.

(21) Appl. No.: 11/094,107

(22) Filed: Mar. 31, 2005

(65) Prior Publication Data

US 2005/0229022 A1    Oct. 13, 2005

(30) Foreign Application Priority Data

Mar. 31, 2004   (JP) ............................. 2004-108392

(51) Int. Cl.
*G06F 11/00* (2006.01)

(52) U.S. Cl. ................................. 714/6; 714/12; 714/13

(58) Field of Classification Search .................... 714/6, 714/12, 13; 711/162, 147; 707/204
See application file for complete search history.

(56) References Cited

U.S. PATENT DOCUMENTS

| | | | | |
|---|---|---|---|---|
| 5,574,863 | A * | 11/1996 | Nelson et al. ................. | 710/100 |
| 5,588,132 | A * | 12/1996 | Cardoza ....................... | 711/148 |
| 6,148,415 | A * | 11/2000 | Kobayashi et al. ............. | 714/15 |
| 6,170,044 | B1 * | 1/2001 | McLaughlin et al. ........ | 711/162 |
| 6,324,654 | B1 * | 11/2001 | Wahl et al. ...................... | 714/6 |
| 6,549,921 | B1 | 4/2003 | Ofek | |
| 6,735,717 | B1 * | 5/2004 | Rostowfske et al. ........... | 714/13 |
| 6,832,298 | B2 * | 12/2004 | Fujii et al. .................... | 711/147 |
| 6,978,396 | B2 * | 12/2005 | Ruuth et al. ..................... | 714/6 |
| 7,200,620 | B2 * | 4/2007 | Gupta .......................... | 707/201 |
| 2004/0010502 | A1 | 1/2004 | Bomfirm et al. | |
| 2006/0224918 | A1 * | 10/2006 | Koike ........................... | 714/11 |

FOREIGN PATENT DOCUMENTS

| | | |
|---|---|---|
| JP | 61-136137 | 6/1986 |
| JP | 04-299435 | 10/1992 |
| JP | 05-028057 | 2/1993 |
| JP | 05-257796 | 10/1993 |
| JP | 08-221289 | 8/1996 |
| JP | 10-254748 | 9/1998 |
| JP | 11-149388 | 6/1999 |
| JP | 2001-243209 | 9/2001 |
| JP | 2001-318801 | 11/2001 |

(Continued)

OTHER PUBLICATIONS

"Informix Dynamic Server.2000, Technical Brief" by Informix Corporation. copyright 2000.*
Frence Patent Office issued a Search Report on Nov. 5, 2008.
Japanese Patent Office issued a Japanese Office Action dated Jun. 22, 2010, Application No. 2008-8867.

*Primary Examiner*—Philip Guyton
(74) *Attorney, Agent, or Firm*—Young & Thompson

(57) ABSTRACT

Server apparatuses that configure a data mirror cluster system include databases, shared memories, and memory controllers, respectively. The server apparatuses are connected by interconnects and can directly access communication partner's shared memories via the memory controllers, respectively. One of the server apparatuses operates as an operation server apparatus and the other operates as a standby server apparatus. The memory controller of the operation system updates the database and writes changed data to the shared memory of the standby system. The memory controller of the standby system updates the database of the standby system according to the changed data written to the shared memory of the standby system.

17 Claims, 9 Drawing Sheets

FOREIGN PATENT DOCUMENTS

| | | |
|---|---|---|
| JP | 2002-32239 | 1/2002 |
| JP | 2002-287999 | 10/2002 |
| JP | 2003-84995 | 3/2003 |
| JP | 2003-108400 | 4/2003 |
| JP | 2003-218984 | 7/2003 |
| JP | 2003-241992 | 8/2003 |

* cited by examiner

DATA MIRROR CLUSTER SYSTEM, METHOD AND COMPUTER PROGRAM FOR SYNCHRONIZING DATA IN DATA MIRROR CLUSTER SYSTEM

BACKGROUND OF THE INVENTION

1. Field of the Invention

The present invention relates to a data mirror cluster system and a method for synchronizing data, and particularly to a cluster system and method capable of synchronizing data of multiple servers at high speed.

2. Description of the Related Art

In the data mirror cluster system, the respective nodes are connected to each other using a connecting section such as LAN and the like as an interconnect to synchronize data between nodes.

However, when a protocol such as TCP/IP is used, a software stack for use in the protocol is deep and communication is performed via an I/O device and the like to cause a problem in which latency is increased.

The interconnect used here is a connecting section, which serves as an input/output interface between an operation server and a standby server (multiple standby servers may be possible) that configure the cluster to synchronize data between the operation server and the standby server.

Moreover, the latency indicates a time difference in synchronization between the start of synchronization processing and the end thereof when data of the operation server updated by the operation server is synchronized with the standby server.

In the data mirror cluster system, there is need to update a database of the standby system based on a change in data stored in the database of the operation server as required to obtain synchronization between the operation server and the standby server.

In the case of the system having a large latency, much time is required to perform data synchronization between the operation server and the standby server. Since time intervals in data synchronization are increased, there is a case in which an amount of data to be transferred in one synchronization processing is increased As a result, when trouble occurs in the operation server to fail over to the standby system, an amount of information to be lost is increased since synchronization with the standby system is not obtained during the trouble, so that merits resulting from combination with the cluster configuration are reduced.

Unexamined Japanese Patent Application KOKAI Publication No. H04-299435 discloses one of synchronization controlling methods in a cluster system. In this cluster system, each of an operation server and a standby server has a different database. This cluster system can perform synchronization in database between the operation server and the standby server in an on-line state. However, in this cluster system, an idea for reducing the latency is not provided.

Unexamined Japanese Patent Application KOKAI Publication No. H08-221289 discloses another improved cluster system configuring method. In this cluster system, each node has a memory address space of the corresponding system and a memory address space of the other system. Moreover, there is a symmetry in a logical structure between the memory address space of the corresponding system and the memory address space of the other system.

However, in this configuration, management of the memory address space of the corresponding system and the memory address space of the other system is complicated. Moreover, an address conversion between the memory address space of the corresponding system and the memory address space of the other system is required.

Unexamined Japanese Patent Application KOKAI Publication No. H11-149388 discloses further another improved cluster system configuring method. In this cluster system, each of an operation server and a standby server has two main storage devices. When data is stored in a first main storage device of one server apparatus, data is transferred to a second main storage device of the other server apparatus to perform synchronization using DMA (Direct Memory Access) transfer.

However, in this configuration, management of memory address spaces of two main storage devices is complicated. Moreover, a DMA controller is required to be initialized at a DMA transfer staring time, so that a bottleneck of latency may occur.

As mentioned above, in the conventional data mirror cluster system, there are problems in that much time is required to perform data synchronization between the operation server and the standby server and management of the memory address spaces is complicated.

The present invention has been made with consideration given to the aforementioned circumstances, and an object of the present invention is to reduce an amount of data failing in mirror synchronization at a trouble occurring time.

Moreover, another object of the present invention is to provide a cluster system with easy control and management and its controlling method.

SUMMARY OF THE INVENTION

In order to attain the above object, a data mirror cluster system according to the present invention includes multiple server apparatuses having one serving as an operation system and at least another one serving as a standby system; Each of the server apparatuses includes a database and a shared memory accessible from the server apparatuses. The server apparatuses are connected to each other by interconnects that can transfer changed data of each of the databases to the communication partner's shared memory. And, each of the server apparatuses includes a memory driver section for the operation system which writes a change in data on the database of the operation system to the shared memory existing in the standby server apparatus when the associated server apparatus is operating as the operation system, and a memory driver section for the standby system which writes data transferred on the shared memory of the standby system via the interconnect to the database of the standby system when the associated server apparatus is operating as the standby system.

For example, the memory driver section of the operation system directly writes data to the shared memory existing in the standby server apparatus via the interconnect.

It is desirable that the interconnect and the shared memory are multiplexed.

It is desirable that each of the server apparatuses comprises an input/output ports for connecting to an external circuit, and that the interconnect is a dedicated circuit that is used when one server apparatus gains access to the shared memory of the other server apparatus.

In order to attain the above object, a synchronization controlling method according to the present invention is a method for synchronizing data in a data mirror cluster system comprising multiple server apparatuses connected to each other via an interconnect, and each of the server apparatuses having a shared memory which is shared with the multiple server apparatuses.

The synchronization controlling method detects an update of data on the database of an operation server apparatus, writes data representing updated data to the shared memory physically existing in a standby server apparatus via the interconnect, detects an update of data on the shared memory of the standby server apparatus, and updates the database of the standby server apparatus based on the data on the shared memory existing in the standby server apparatus.

According to the present invention, since data synchronization is obtained by the multiple server apparatuses using the shared memory and the interconnect, the mirror cluster with a small latency can be configured with high speed. This makes it possible to reduce an amount of data to be lost at a trouble occurring time as compared with the conventional case and to improve system availability. Moreover since the shared memory is used by the multiple server apparatuses, management is easy.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A data mirror cluster system according to an embodiment of the present invention will be explained with reference to the drawings.

Figure 1:
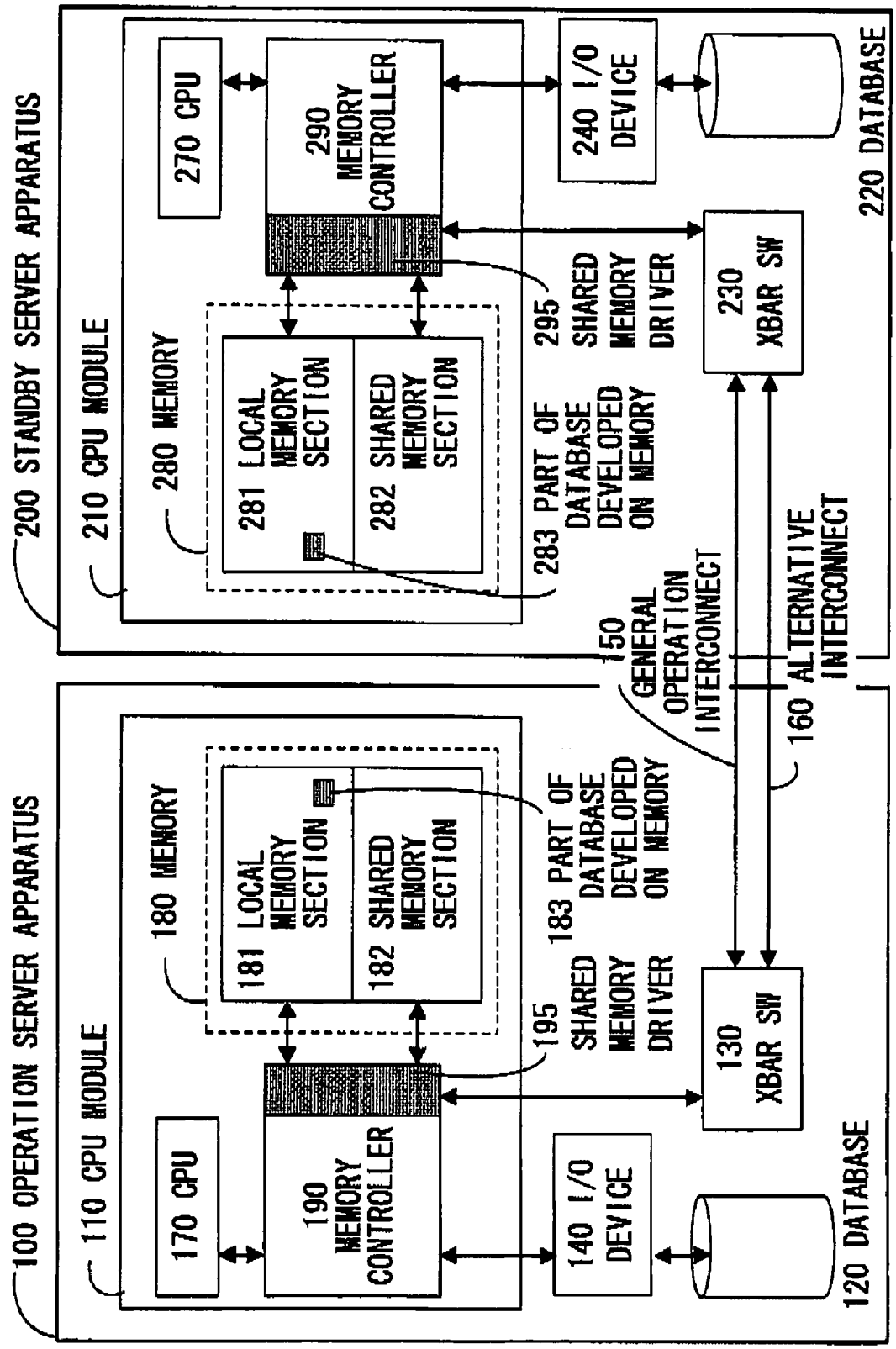
FIG. 1 is a block diagram illustrating a configuration of a data mirror cluster system according to an embodiment of the present invention.

FIG. 1 is a configuration example of a data mirror cluster system according to an embodiment of the present invention including two server apparatuses 100 and 200. The server apparatuses 100 and 200 have the same hardware configuration. In FIG. 1, the server apparatus 100 is an operation server apparatus and the server apparatus 200 is a standby server apparatus.

The server apparatuses 100 and 200 are connected to each other by an interconnect that can transfer changed contents of the database possessed by one apparatus and a synchronization signal to the other node (server apparatus) 200 or 100 at high speed. For example, in FIG. 1, the interconnect between the respective nodes is duplexed to improve fault tolerance. In the embodiment of FIG. 1, an interconnect 150 is generally used and an interconnect 160 is used as an alternative.

The server apparatus 100 includes a CPU module 110, a database 120, a crossbar switch (XBAR SW) 130, and an I/O (Input/Output) device 140.

The CPU module 110 includes one or multiple CPUs 170 and a memory 180, and a memory controller 190.

The CPU module 110 executes control of the server apparatus 100 and data processing.

The memory 180 includes a main storage device and an auxiliary storage device. The memory 180 includes a local memory section 181 that can gain access from only the server apparatus 100 and a shared memory section 182 that can gain access from not only the server apparatus 100 but also the server apparatus 200.

The shared memory section 182 is a memory that can directly execute reading/writing via the interconnect 150 or 160 from the server apparatus 200 in addition to the server apparatus 100.

The memory controller 190 is a control device that gains access to the memory 180 including the local memory section 181 and the shared memory section 182, and has a shared memory driver 195 necessary to gain access to the shared memory section 182.

The database 120 physically exists on a recording device connected to the I/O device 140. For example, in the embodiment of the present invention, the database 120 physically exists on a hard disc.

In the memory 180, there exists a part 183 of the database 120 developed on the local memory section 181. Contents of data are the same as those of the database 120.

The memory controller 190 performs access control of the database 120 and the part 183 of the database developed on the local memory section.

For example, when data of the database 120 is searched, the memory controller 190 develops the searching method and searching result on the memory as cache and stores them.

Moreover, for example, when data of the database 120 is searched, the memory controller 190 gains access to the part 183 of the database developed on the memory preferentially to make it possible to obtain a searching result at high speed.

The memory controller 190 is connected to the crossbar switch 130. Furthermore, the crossbar switch 130 is connected to the interconnects 150 and 160.

The crossbar switch 130 controls data reception and transmission from/to the shared memory section 282 of the server apparatus 200 via the interconnect 150 or 160. For example, the crossbar switch 130 has a function that monitors whether there is a hardware trouble in the interconnects 150 and 160 to send a notice to the CPU 170 at a trouble occurring time. The monitoring function will be described later.

The I/O device 140 is connected to the memory controller 190 and receives and transmits information from/to an external device by an instruction from the CPU 170. The external device includes, for example, a hard disc drive, a compact disc drive, a magnetic tape device, and the like.

The I/O device 140 has a function common to the interconnects 150 and 160 in terms of the point that data is received and transmitted from/to the external device. Furthermore, in the using method of the I/O device 140, there is versatility unlike the interconnects 150 and 160.

However, in order to receive and transmit data from/to the external device using the I/O device 140, it is necessary to initialize a driver for the external device. For this reason, as compared with the use of the I/O device 140, high communication processing speed is achieved by using the interconnects 150 and 160, which a dedicated circuit for connecting to the shared memory.

The server apparatus 200 has substantially the same hardware configuration as that of the server apparatus 100. The server apparatus 200 includes a CPU module 210, a database 220, a crossbar switch 230, and an I/O device 240.

The CPU module 210 includes one or multiple CPUs 270, a memory 280, and a memory controller 290.

The CPU 270 executes control of the server apparatus 200 and data processing.

The memory 280 includes a main storage device and an auxiliary storage device. The memory 280 includes a local memory section 281 that can gain access from only the server apparatus 200 and a shared memory section 282 that can gain access from not only the server apparatus 200 but also the server apparatus 100.

The shared memory section 282 is a memory that can directly execute reading/writing via the interconnect 150 or 160 from the server apparatus 100 in addition to the server apparatus 200.

The memory controller 290 is a control device that gains access to the memory 280 including the local memory section 281 and the shared memory section 282, and has a shared memory driver 295 necessary to gain access to the shared memory section 282.

The database 220 physically exists on a hard disc connected to the I/O device 240.

In the memory 280, there exists a part 283 of the database 220 developed on the local memory section 281. The contents of data are the same as those of the database 220. The memory controller 290 performs access control of the database 220 and the part 283 of the database developed on the local memory section.

The memory controller 290 is connected to the crossbar switch 230. Furthermore, the crossbar switch 230 is connected to the interconnects 150 and 160.

The crossbar switch 230 controls data reception and transmission from/to the shared memory section 182 of the server apparatus 100 via the interconnect 150 or 160. For example, the crossbar switch 230 has a function that monitors whether there is a hardware trouble in the interconnects 150 and 160 to send a notice to the CPU 270 at a trouble occurring time.

Of two server apparatuses 100 and 200 that configure the cluster, one is operated as the operation server apparatus and the other is operated as the standby server apparatus.

In an example shown in FIG. 1, the server apparatus 100 is used as the operation server apparatus and the server apparatus 200 is used as the standby server apparatus. However, the server apparatus 100 may be used as the standby server apparatus and the server apparatus 200 may be used as the operation server apparatus. In this case, no influence is exerted on the operation of the cluster system of the present invention.

When processing executed by the CPU 170 of the operation system directly requests a change in data of the database 120 of the operation system, the memory controller 190 updates the database 120 and writes changed data to the shared memory section 282 of the standby server apparatus 200 via the interconnect 150 or 160.

Moreover, data whose change is requested by the processing executed by the CPU 170 of the operation system exists in the part 183 of the database developed on the local memory, the memory controller 190 updates both the database 120 of the operation system and the part 183 of the database on the memory. Moreover, the memory controller 190 writes the changed data to the shared memory section 282 of the standby server apparatus 200 via the interconnect 150 or 160.

The memory controller 290 of the standby server apparatus 200 always monitors whether changed data is written to the shared memory section 282 from the operation server apparatus 100. The memory controller 290 updates the database 220 of the standby system according to the changed data written to the shared memory section 282 by the operation server apparatus 100.

As a result, synchronization between the database 120 of the operation system and the database 220 of the standby system is performed to implement the data mirror cluster system.

When trouble occurs in the operation server apparatus 100, execution of an application fails over to the standby server apparatus 200 in the cluster system. Data whose synchronization is not yet completed at this time is lost.

For this reason, after the. system is recovered in the standby server apparatus 200, the application is required to be reexecuted to register data again. Moreover, after the server apparatus 100 is recovered, all of the databases 120 and 220 must be synchronized with each other.

The use of the data mirror cluster system according to the present invention makes it possible to reduce data synchronization intervals between the operation system and the standby system and to minimize the amount of data to be lost at the trouble occurring time as compared with the conventional mirror cluster system.

Figure 2:
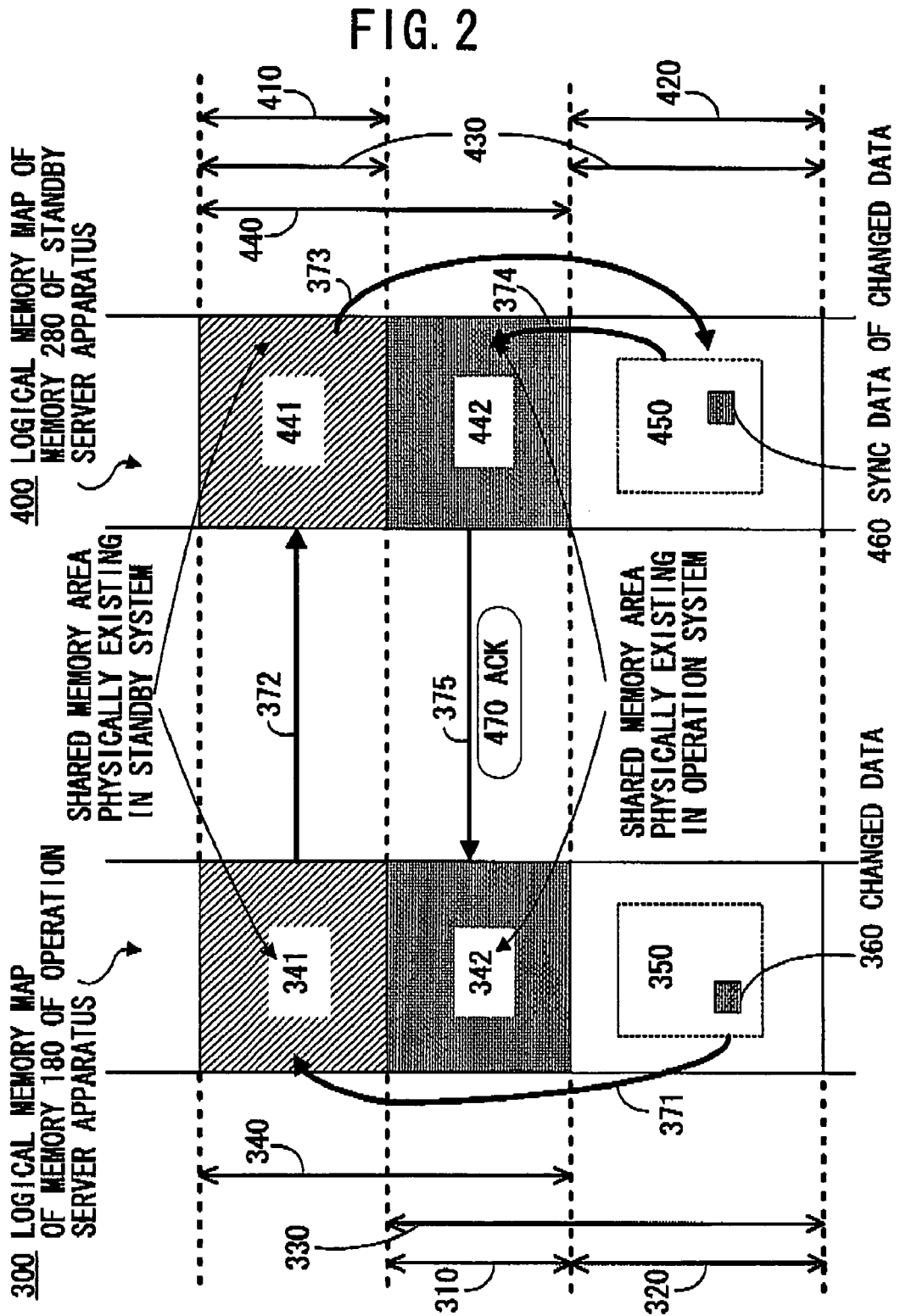
FIG. 2 is a view illustrating a logical memory map of each of an operation system and a standby system.

An explanation will be next given of a memory allocation of the above-configured data mirror cluster system with reference to FIG. 2.

FIG. 2 illustrates a logical memory map of each of the operation server apparatus 100 and the standby server apparatus 200.

As described above, the operation server apparatus 100 and the standby server apparatus 200 have the readable/writable shared memory sections 182 and 282, respectively. Moreover, a logical address is given to each of the shared memory sections 182 and 282.

The logical address allocated to the operation server apparatus 100 includes a shared memory area 340. Furthermore, the shared memory area 340 includes an area 342 physically existing in the operation system and an area 341 physically existing in the standby system.

The area 341 physically existing in the standby system is an logical address area where the contents of the shared memory section 282 of the standby system can be seen from the operation server apparatus 100 via the interconnect 150 or 160.

In other words, the shared memory section 282 existing in the standby server apparatus 200 is recognized as a memory space of the logical address area 341 from the CPU 170 of the operation server apparatus 100 and is recognized as a memory space of a logical address area 441 from the CPU 270 of the standby server apparatus 200. Namely, the contents of the logical address area 341 of the operation system are the same as those of the logical address area 441 of the standby system.

Accordingly, the CPU 170 can gain access to the shared memory area 340 without recognizing whether the physical memory is present in the operation system or the standby system. Namely, the CPU 170 can gain access to the shared memory section 282 of the standby system without performing intermediate processing such as an address conversion, etc.

Similarly, the logical address allocated to the standby server apparatus 200 includes a shared memory area 430. Furthermore, the shared memory area 430 includes an area 441 physically existing in the standby system and an area 442 physically existing in the operation system.

The area 442 physically existing in the operation system is an logical address area where the contents of the shared memory section 182 of the operation system can be seen from the standby server apparatus 200 via the interconnect 150 or 160.

In other words, the shared memory section 182 existing in the operation server apparatus 100 is recognized as a memory space of the logical address area 442 from the CPU 270 of the standby server apparatus 100 and is recognized as a memory space of the logical address area 342 from the CPU 170 of the operation server apparatus 100. Namely, the contents of the logical address area 442 of the standby system are the same as those of the logical address area 342 of the operation system.

Accordingly, the CPU 270 can gain access to the shared memory area 440 without recognizing whether the physical memory is present in the operation system or the standby system. Namely, the CPU 270 can gain access to the shared memory section 182 of the operation system without performing intermediate processing such as an address conversion, etc.

Figure 3:
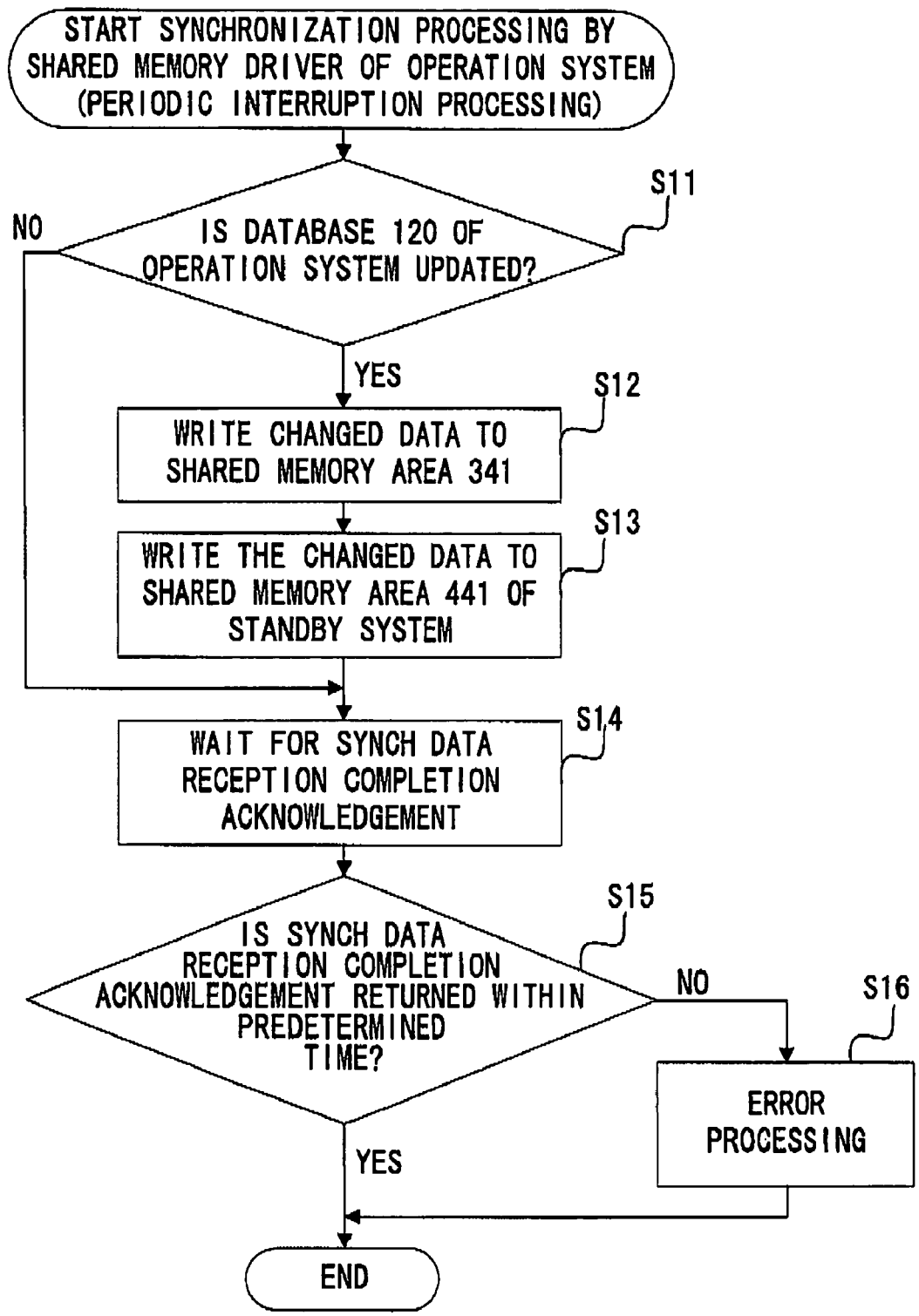
FIGS. 3A and 3B are flowcharts each explaining an operation of a synchronization processing driver of each of the operation system and the standby system.
Figure 3:
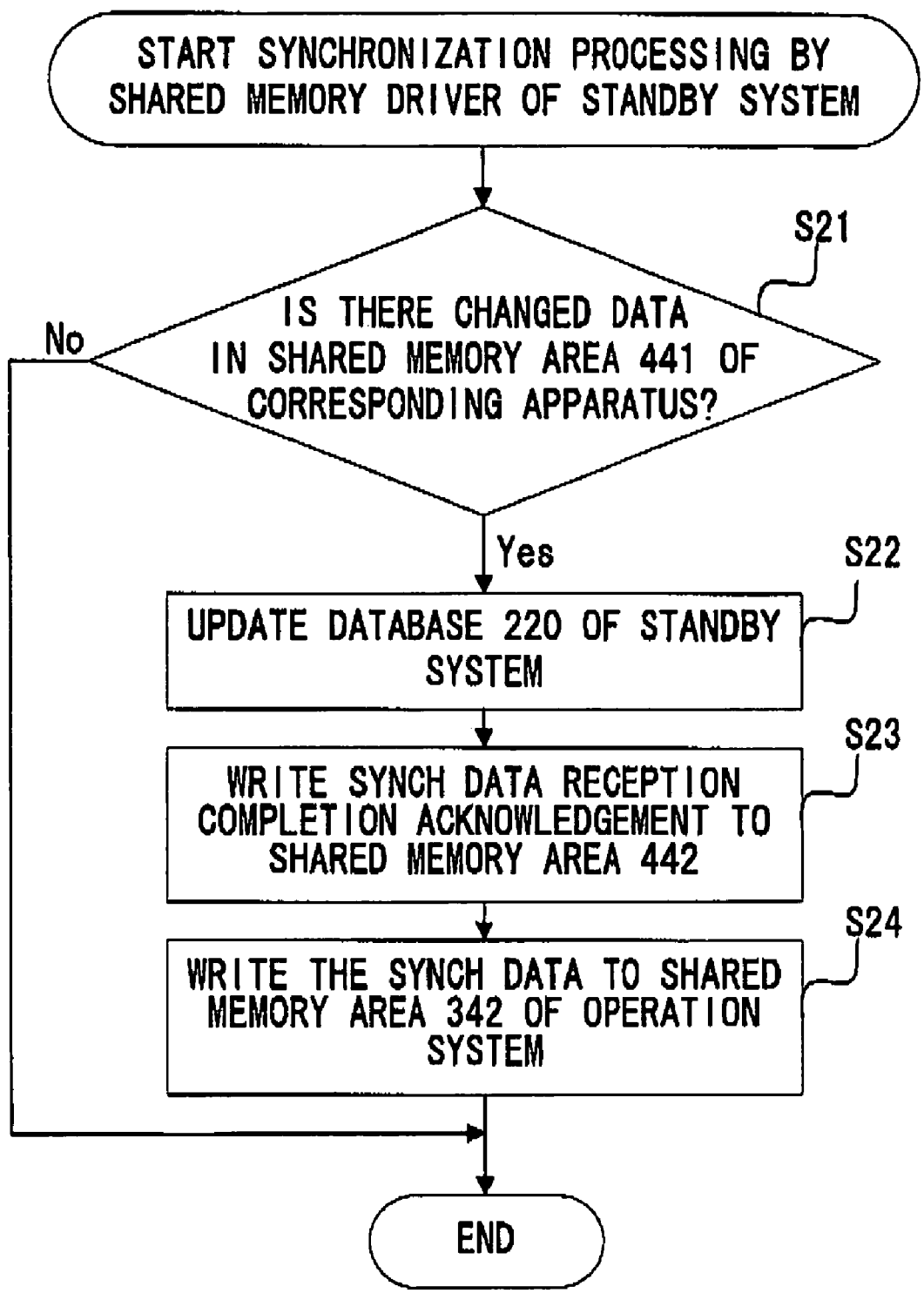

An explanation will be next given of an operation of the above-configured cluster system with reference to FIG. 2, FIG. 3A, and FIG. 3B.

The memory controller 190 of the operation server apparatus 100 includes a shared memory driver 195.

The shared memory driver 195 reads data of the local memory section 181 and the shared memory section 182 according to an instruction from the CPU 170. Moreover, the shared memory driver 195 writes data to the local memory section 181 and the shared memory section 182 according to an instruction from the CPU 170.

Furthermore, the shared memory driver 195 can read data of the shared memory section 282 existing in the standby server apparatus 200 using the logical memory area 341 according to an instruction from the CPU 170. Moreover, the shared memory driver 195 can write data to the shared memory section 282 existing in the standby server apparatus 200 using the logical memory area 341 according to an instruction from the CPU 170.

Similarly, the memory controller 290 of the standby server apparatus 200 includes a shared memory driver 295. The shared memory driver 295 reads data of the local memory section 281 and the shared memory section 282 according to an instruction from the CPU 270. Moreover, the shared memory driver 295 writes data to the local memory section 281 and the shared memory section 282 according to an instruction from the CPU 270.

Furthermore, the shared memory driver 295 can read data of the shared memory section 182 existing in the operation server apparatus 100 using the logical memory area 442 according to an instruction from the CPU 270. Moreover, the shared memory driver 295 can write data to the shared memory section 182 existing in the operation server apparatus 100 using the logical memory area 442 according to an instruction from the CPU 270.

The shared memory drivers 195 and 295 that read and write data of the shared memory sections 182 and 282 perform processing illustrated in FIG. 3A and FIG. 3B. For example, the shared memory drivers 195 and 295 execute these processing using a regular interruption.

As illustrated in FIG. 3A, when updating the database 120 (step S11:Yes in FIG. 3A), the shared memory driver 195 of the operation system writes changed data to the shared memory area 341 (step S12 in FIG. 3A).

As mentioned above, data of the shared memory area 341 logically existing in the operation system is the same as data of the shared memory area 441 logically existing in the standby system. Accordingly, writing a data into the shared memory 341 by the operation system is equal to writing the data into the shared memory 441 via the interconnects 150 and 160 (step S13 in FIG. 3A).

The shared memory driver 195 of the operation system enters in a state of waiting for receiving a synchronization data reception completion acknowledgement (ACK) 470 from the standby system (step S14 in FIG. 3A).

The shared memory driver 195 of the operation system that is in an ACK reception waiting state ends synchronization processing when receiving the synchronization data reception completion acknowledgement 470 from the standby system (step S15:Yes in FIG. 3A). However, when the ACK reception waiting state is continued for more than a predetermined time (step S15:No in FIG. 3A), the ACK reception waiting state reaches time-out and the memory controller 190 of the operation system transfers to synchronization error processing (step S16 in FIG. 3A).

On the other hand, as illustrated in FIG. 3B, when changed data is written to the shared memory area 441 by the operation server apparatus 100 (step S21:Yes in FIG. 3B), the shared memory driver 295 of the standby system updates the database 220 of the standby system according to the changed data (step S22 in FIG. 3B). Thereafter, the shared memory driver 295 of the standby system writes the synchronization data reception completion acknowledgement 470 to the shared memory area 442 (step S23 in FIG. 3B).

The synchronization data reception completion acknowledgement 470 is written to the shared memory area 342 via the interconnects 150 and 160 (step S24 in FIG. 3B). The shared memory driver 295 of the standby system ends processing when writing the synchronization data reception completion acknowledgement.

When detecting writing of the synchronization data reception completion acknowledgement 470, the shared memory driver 195 of the operation system recognizes that synchronization processing is completed and ends the ACK reception waiting state (step S15 in FIG. 3B).

In this way, according to the present invention, synchronization between the database of the operation system and the database of the standby system is obtained by gaining access to the shared memories each other existing the operation server apparatus and the standby server apparatus.

In the data mirror cluster system, in the case of occurrence of trouble in the operation server, a portion where database synchronization is not completed occurs when the system operation fails over to the standby server. For this reason, a system manager and a user must carry out a task such as the application is reexecuted to register data again after fallover.

Accordingly, in the cluster system having a large latency, a portion where database synchronization is not obtained at a trouble occurring time is increased, so that availability of the database is reduced.

In the conventional data mirror cluster system, the cluster is configured using TCP/IP as a communication protocol between the respective nodes.

Figure 4:
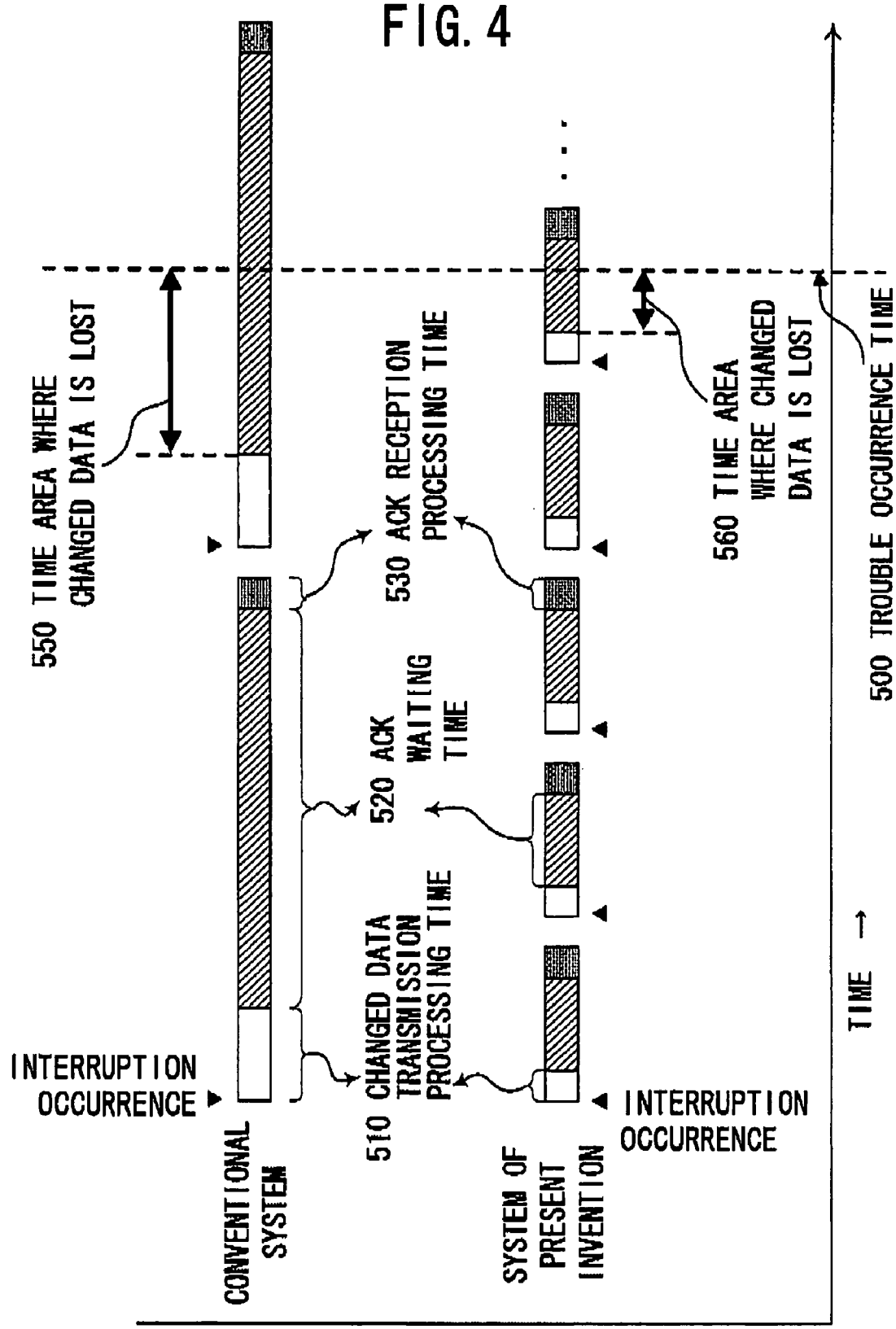
FIG. 4 is a view explaining synchronization operation timing, latency, size in changed data for synchronization in each of a conventional mirror cluster system and a mirror cluster system of the present invention.

FIG. 4 is a view conceptually illustrating the relationship between the magnitude of latency and the size of data to be lost at a system trouble time.

As illustrated in FIG. 4, in the conventional system having a large ACK waiting time (latency) 520, synchronization processing can not be frequently carried out. Moreover, the size of data that is trasmitted at one synchronization must be increased in order to improve efficiency of synchronization processing. For this reason, the size of data to be lost when trouble occurs in the operation server is increased, so that much time is taken to reregister data at an application reexecuting time.

In contrast to this, according to the method of the present embodiment, changed data is only written to the communication partner's shared memory directly, making it possible to obtain synchronization between the database 120 of the operation system and the database 220 of the standby system.

Accordingly, the cluster system of the present embodiment can reduce the latency at the database synchronization as compared with the conventional case. Moreover, the cluster system of the present embodiment can synchronize the databases frequently.

Furthermore, the size of data that is lost at a trouble occurring time can be reduced and data reregistration can be quickly ended at an application reexecuting time after trouble is recovered.

As long as the synchronization of the databases 120 and 220 is maintained, the format of data to be stored in the shared memories 441 and 342 and to be transmitted via the interconnects 150 and 160 is arbitrary. For example, the data may be one representing a difference between the previous (pre-updated) data and the updated data. In this case, the memory driver 295 calculates the updated data based on the received data and the previous data, and updates the database 220.

An explanation will be given of duplexing of interconnect using the shared memory using FIGS. 5, 6A, 6B, and 6C.

Figure 5:
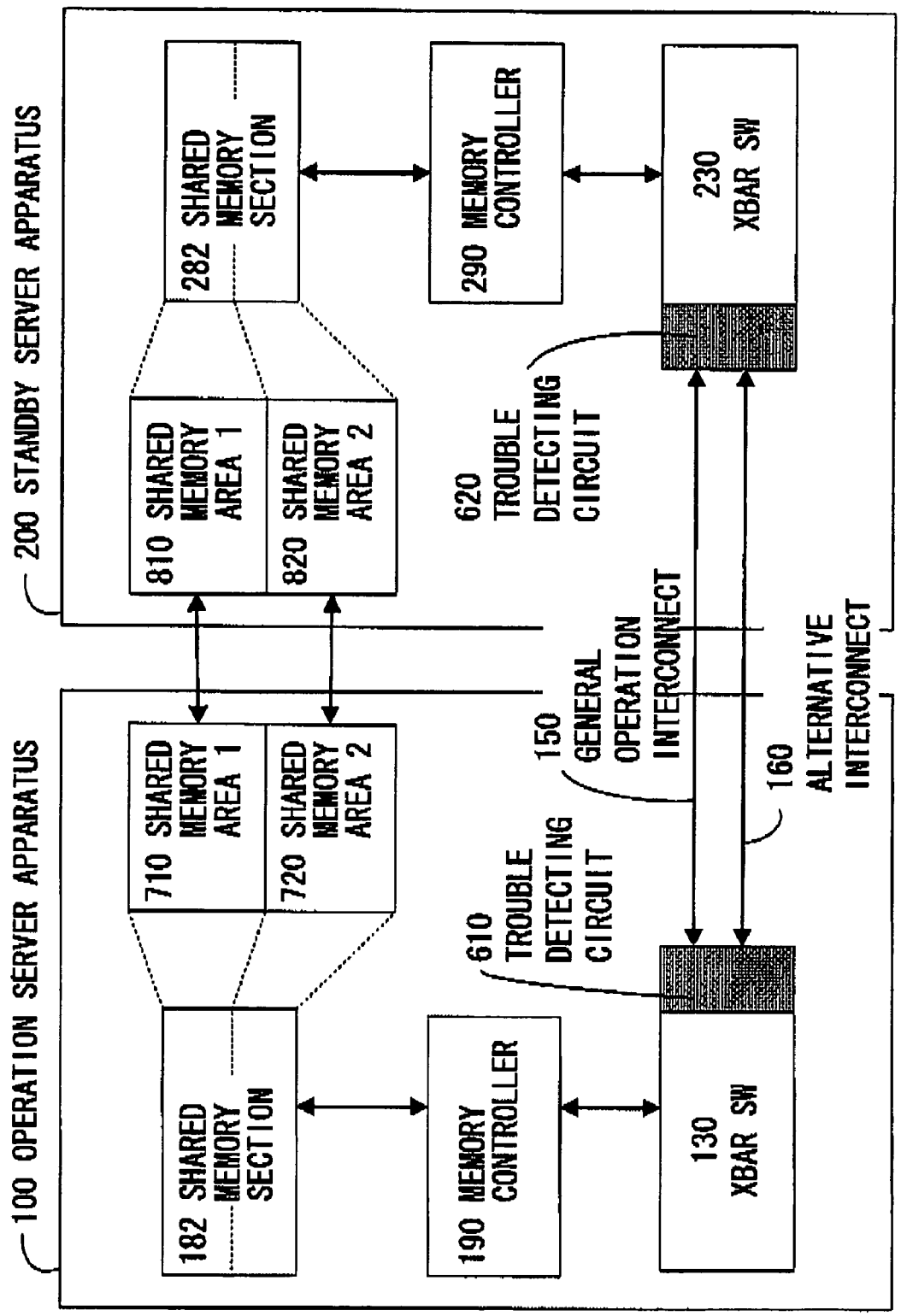
FIG. 5 is a view illustrating a configuration example of a duplexed interconnect.

As illustrated in FIG. 5, the interconnect is duplexed in the present embodiment. One data path (interconnect 150) is used at a general operating time and the other data path (interconnect 160) is used as an alternative path when trouble occurs in the data path for general operation.

The crossbar switches 130 and 230 include trouble detecting circuits 610 and 620. The trouble detecting circuits 610 and 620 always monitor whether the interconnects 150 and 160 can be normally used. When a hardware trouble occurs in the interconnects 150 and 160, the trouble detecting circuits 610 and 620 detect trouble and notify the CPUs 170 and 270 of the trouble detection, respectively.

Each of the shared memory sections 182 and 282 is logically divided into two areas.

Figure 6:
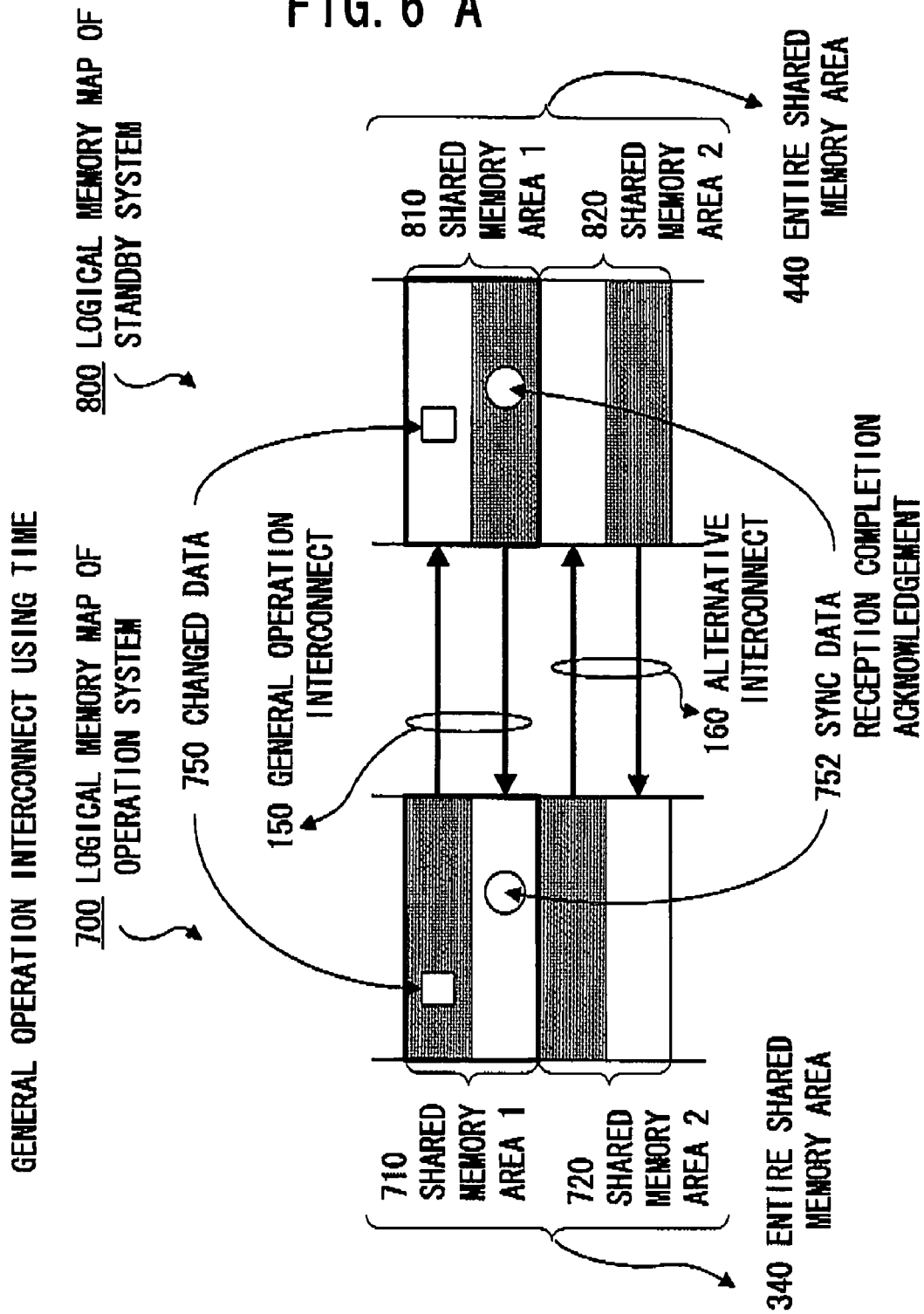
FIGS. 6A, 6B, and 6C are views explaining an operation when trouble occurs in a duplexed interconnect.
Figure 6:
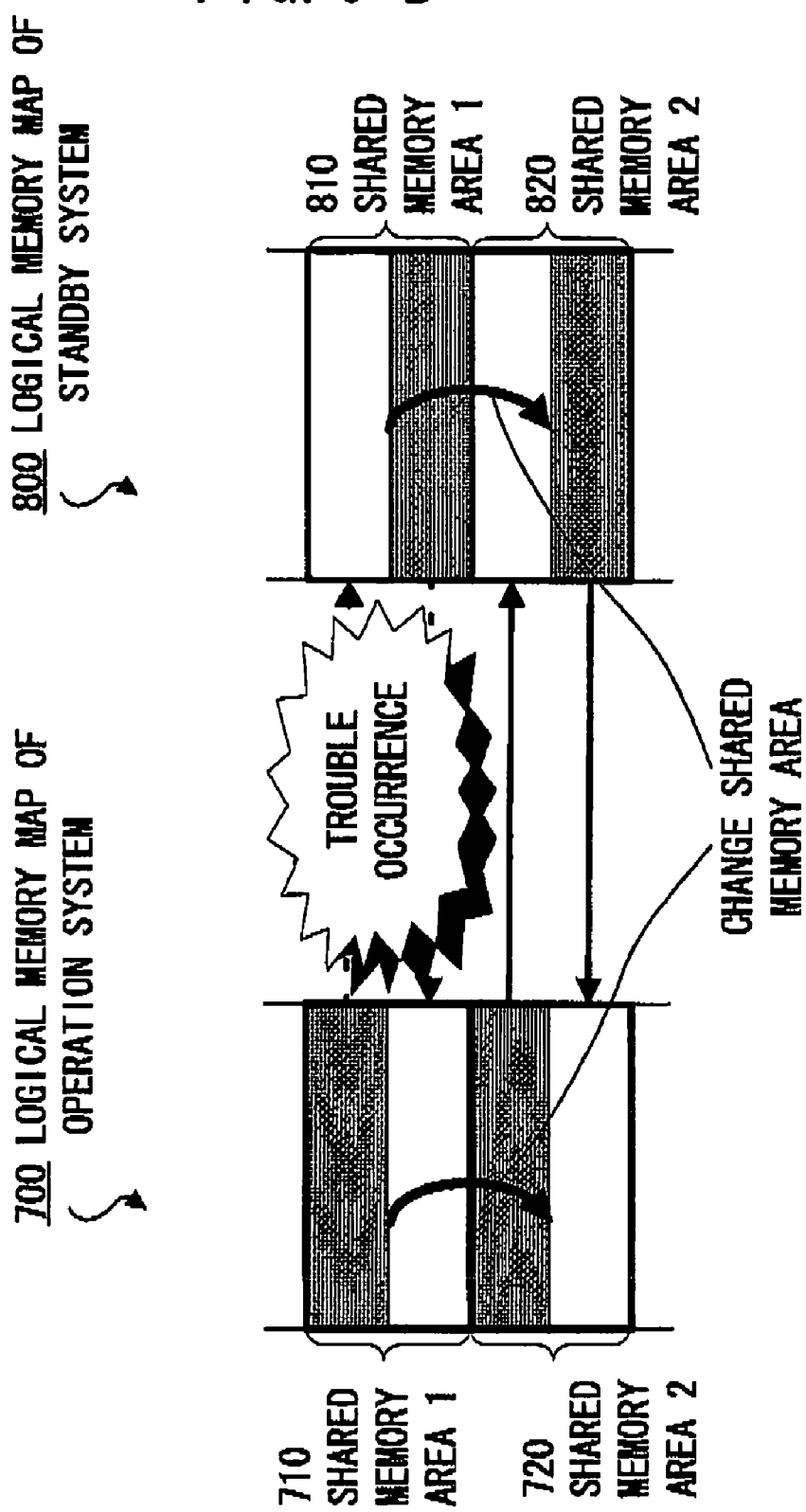
Figure 6:
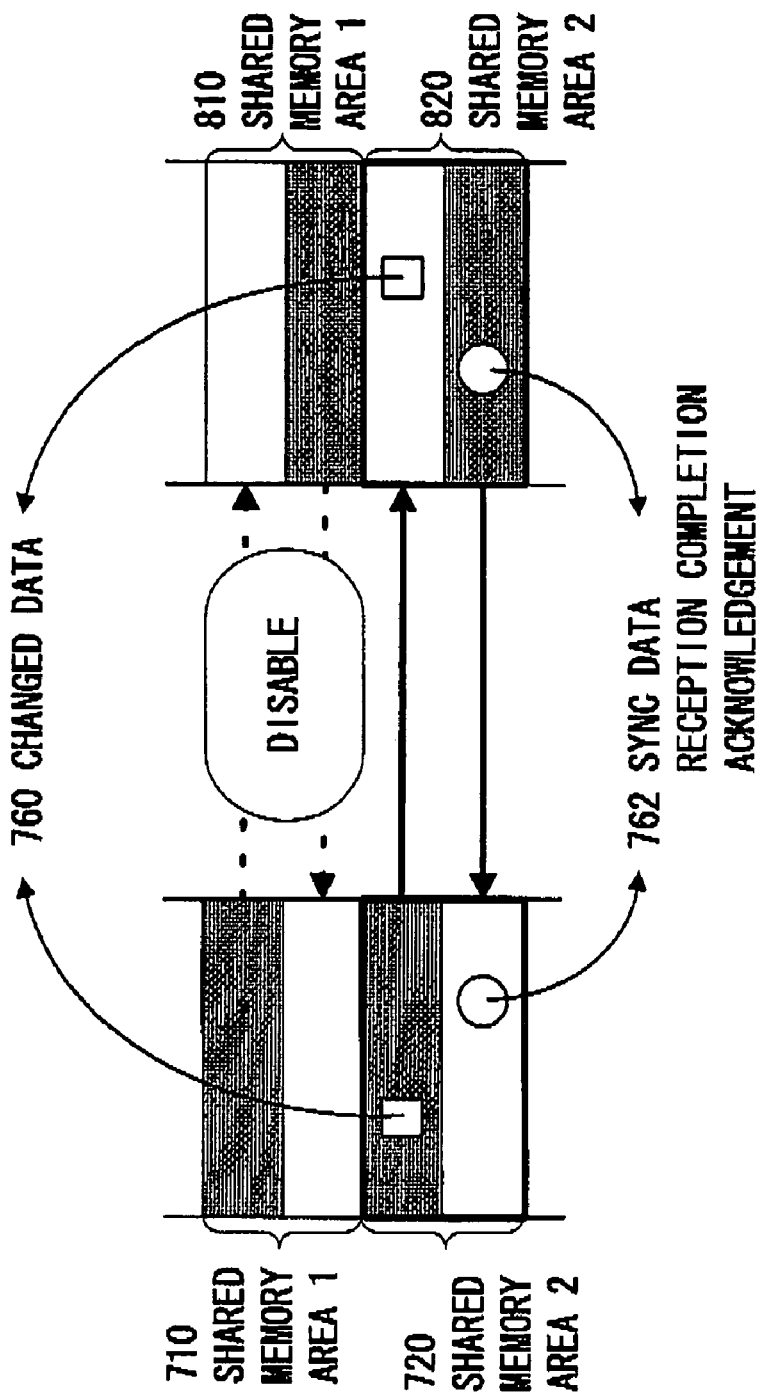

FIGS. 6A, 6B, and 6C are views further precisely illustrating only the shared memory section among the logical memory maps of the operation server and the standby server of the present embodiment.

The entire shared memory area 340 includes a shared memory area 1 (710) and a shared memory area 2 (720). Though a different logical memory address is given to each of the shared memory area 1 (710) and the shared memory area 2 (720), their memory structures are completely the same logically.

Similarly, the entire shared memory area 440 includes a shared memory area 1 (810) and a shared memory area 2 (820). Though a different logical memory address is given to each of the shared memory area 1 (810) and the shared memory area 2 (820), their memory structures are completely the same logically.

The shared memory areas 1 (710, 810) and the shared memory areas 2 (720, 820) of both nodes are associated with different interconnects, respectively. In the present embodiment, the shared memory areas 1 (710, 810) are associated with the general operation interconnect 150 and the shared memory areas 2 (720, 820) are associated with the alternative interconnect 160.

Namely, the shared memory driver 195 of the operation system selects either the shared memory area 1 (710) or 2 (720) of the logical memory address, making it possible to decide which duplex interconnect is used. Moreover, the shared memory driver 295 of the standby system selects either the shared memory area 1 (810) or 2 (820) of the logical memory address, making it possible to decide which duplex interconnect is used.

Additionally, regarding the shared memory area that is selected by each of the shared memory drivers 195 and 295, both drivers use the shared memory areas 1 or both use the shared memory areas 2.

In this way, according to the method of the present embodiment, the interconnect is duplex using the shared memory.

An explanation will be next given of a case in which trouble occurs in the duplex interconnect.

FIG. 6A shows a case at a general operation time.

The shared memory driver 195 of the operation system updates the database 120 and writes changed data 750 to the shared memory area 1 (710). Namely, the shared memory driver 195 of the operation system writes changed data 750 to the shared memory of the standby system using the general operation interconnect 150.

The shared memory driver 295 of the standby system updates the database 220 of the standby system according to the changed data 750. Thereafter, the shared memory driver 295 of the standby system writes a synchronization data reception completion acknowledgement 752 to the shared memory area 1 (810). Namely, the memory driver 295 of the standby system writes the synchronization data reception completion acknowledgement 752 to the shared memory of the operation system using the general operation interconnect 150. When detecting the synchronization data reception completion acknowledgement 752, the shared memory driver 195 of the operation system determines that synchronization processing is normally ended, FIG. 6B shows a case in which trouble occurs in the general operation interconnect 150.

The shared memory driver 195 of the operation system detects time-out of synchronization processing without receiving the synchronization data reception completion acknowledgement 752 from the standby server in connection with the changed data 750. Moreover, the trouble detecting circuits 610 and 620 detect trouble occurred in the interconnect 150 of the operation system and notify results to the shared memory drivers 195 and 295, respectively. Each of the shared memory drivers 195 and 295 changes the using shared memory area from the area 1 to the area 2. Namely, each of the shared memory drivers 195 and 295 changes the using interconnect to the alternative interconnect 160.

FIG. 6C shows a case just after the interconnect is changed to the alternative interconnect 160.

The shared memory driver 195 of the operation system writes changed data 760 to the shared memory area 2. The contents of the changed data 760 are the same as those of the changed data 750. Namely, the shared memory driver 195 of the operation system performs rewriting of the changed data to the shared memory using the alternative interconnect 160 and retries synchronization processing.

The shared memory driver 295 updates the database 220 of the standby system according to the changed data 760. Thereafter, the shared memory driver 295 of the standby system writes a synchronization data reception completion acknowledgement 762 to the shared memory of the operation system using the alternative interconnect 160. When receiving the synchronization data reception completion acknowledgement 762, the shared memory driver 195 of the operation system determines that synchronization processing is normally ended.

When trouble occurs in both duplex interconnects, the trouble detecting circuits 610 and 620 detect that trouble occurs in both interconnects. After that, the trouble detecting circuits 610 and 620 send notification of trouble to the shared memory driver 195 of the operation system and the shared memory driver 295 of the standby system, respectively. The shared memory driver 195 of the operation system stops database synchronization processing that uses the shared memory areas 1 and 2. The shared memory driver 295 of the standby system sends notification of trouble to the CPU 270 of the standby server apparatus. The CPU 270 disables the database 220 of the standby system.

When both interconnects each having trouble are recovered, the trouble detecting circuit 610 causes a hardware interruption in the CPU 170. When receiving the interruption, the CPU 170 instructs the shared memory driver 195 to replicate the entire database 120 of the operation system to the database 220 of the standby system and to obtain synchronization. When the database synchronization is completed, the CPU 270 enables the database 220 of the standby system.

As a result, the database is duplicated again.

As mentioned above, in the data mirror cluster system according to this invention, the use of accessible shared memories allows high speed database synchronization. Moreover, it is possible to improve availability of data when trouble occurs.

Additionally, the present invention is not limited to the aforementioned embodiment and various modifications and applications may be possible.

Furthermore, the aforementioned system configuration and processing steps may be arbitrarily changed.

For example, though the number of operation server apparatuses and the number of standby server apparatuses are one, respectively in the present embodiment, the number of standby server apparatuses may be two or more.

Moreover, in the configuration of FIGS. 6A, 6B, and 6C, the number of shared memory areas is two or more and the interconnect may be multiplex.

Furthermore, in the configuration of FIGS. 6A, 6B, and 6C, the number of shared memory areas is one and the interconnect may be multiplex.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2004-108392 filed on Mar. 31, 2004 and including specification, claims, drawings and summary. The disclosure of the above Japanese Patent Application is incorporated herein by reference in its entirety.

What is claimed is:

1. A data mirror cluster system comprising multiple server apparatuses connected via an interconnect with each other and one of multiple server apparatuses serving as an operation system and at least another one serving as a standby system,
 each of said server apparatuses comprising
 a database;
 a shared memory accessible from the server apparatuses,
 a memory driver for the operation system which determines every change in data of a database on the operation system and writes data representing the change in data stored in the database of the operation system to a shared memory of the operation system and for said every change in data of the database simultaneously writes the change in data stored in the database of the operation system to a shared memory existing in the standby server apparatus via the interconnect when an associated server apparatus is operating as the operation system; and
 a memory driver for the standby system which updates data stored in the database of the standby system based on data stored in said shared memory of the standby system which is stored by said operation system via the interconnect when the associated server apparatus is operating as the standby system.

2. The data mirror cluster system according to claim 1, wherein
 the data representing the change comprises changed data itself, said memory driver for the operation system directly writes changed data to said shared memory existing in said standby server apparatus via the interconnect and said memory driver for the standby system writes the changed data stored in said shard memory to the database existing in said standby server apparatus.

3. The data mirror cluster system according to claim 1, wherein
 each of the server apparatuses has first and second memory address spaces;
 the first memory address space is assigned to the shared memory existing therein,
 the second memory address space is assigned to the shared memory existing in a counterpart server apparatus;
 the memory driver for operation system writes data representing the change into the second memory address space, thereby, the data is written in the first memory address space in the counterpart server apparatus via the interconnect.

4. The data mirror cluster system according to claim 3, wherein
 the memory driver for standby system updates the data stored in the database based on data written in a first memory address space thereof.

5. The data mirror cluster system according to claim 3, wherein
 each of the server apparatuses does not have a shared memory to which the second memory address space is assigned,
 a second memory address space is assigned to the shared memory of a counterpart server apparatus and the shared memory of the counterpart server apparatus is assigned with the first memory space of the counterpart server apparatus.

6. The data mirror cluster system according to claim 1, wherein
 the memory driver for operation system updates the data stored in the database and writes data representing the change in the database into the shared memory existing in the standby server apparatus.

7. The data mirror cluster system according to claim 1, wherein at least one of the interconnect and said shared memory is multiplexed.

8. The data mirror cluster system according to claim 1, wherein said interconnect is an exclusive interconnect for transmitting data for synchronizing data stored in the databases of the multiple server apparatuses.

9. The data mirror cluster system according to claim 1, wherein each of said server apparatuses comprises an input/output port for connecting to an external circuit, wherein the interconnect is a dedicated circuit that is used when one server apparatus gains access to said shared memory of the other server apparatus.

10. The data mirror cluster system according to claim 1, wherein the shared memory drivers writes data to local memory sections and shared memory sections according to instructions from programs operating by CPU.

11. The data mirror cluster system according to claim 1, wherein the data representing the change in data stored in the database of the operation system is written without intermediate processing of the data representing change to said shared memory existing in the standby server apparatus.

12. A method for synchronizing data in a data mirror cluster system comprising multiple server apparatuses connected to each other via an interconnect, each of the server apparatuses having a shared memory which is shared with the multiple server apparatuses, comprising:

detecting an update of every data on the database of an operation server apparatus;

writing data representing updated data to the shared memory physically existing in an operation server apparatus and for said every updated data simultaneously writing the data representing updated data to the shared memory physically existing in a standby server apparatus via the interconnect;

detecting an update of data on the shared memory of the standby server apparatus; and updating the database of the standby server apparatus based on the data on the shared memory existing in the standby server apparatus.

13. The method according to claim 12, wherein said writing comprises directly writing data representing the updated data to said shared memory existing in said standby server apparatus via the interconnect.

14. The method according to claim 12, wherein
the writing writes data representing the updated data into a memory address space which is not assigned to any memory existing in the operation system but is assigned to the shared memory via the interconnect.

15. The method according to claim 12, wherein
the writing comprises: sending data representing the updated data to the standby system via the interconnect, receiving the data representing the updated data via the interconnect, writing the received data into the shared memory existing in the standby server apparatus.

16. The method according to claim 12, wherein said writing data representing updated data to the shared memory physically existing in a standby server apparatus via the interconnect is performed without intermediate processing of the updated data on the standby server apparatus.

17. A computer program stored on a computer readable storage medium and executable by a processor for controlling a computer connectable to another computer via an interconnect, to control a database;

to share a shared memory with other computer, to write data representing every change in data stored in the database of this computer upon said every change in data occurring to a shared memory existing in the other computer operating as a standby system of a data mirror cluster system when this computer is operating as the operation system of the data mirror cluster system; and to update the database of this computer based on data stored in said shared memory existing therein when this computer is operating as the standby system of the data mirror cluster system.

* * * * *